(12) United States Patent
Thomas et al.

(10) Patent No.: US 11,175,708 B2
(45) Date of Patent: Nov. 16, 2021

(54) THERMAL SIMULATION FOR MANAGEMENT CONTROLLER DEVELOPMENT PROJECTS

(71) Applicant: AMERICAN MEGATRENDS INTERNATIONAL, LLC, Duluth, GA (US)

(72) Inventors: Satheesh Thomas, Dunwoody, GA (US); Baskar Parthiban, Johns Creek, GA (US); Senathipathy Thangavel, Chennai (IN); Neelavathi Govindasamy, Chennai (IN); Thamarai Selvan Moorthy, Erode (IN)

(73) Assignee: AMERICAN MEGATRENDS INTERNATIONAL, LLC, Duluth, GA (US)

(*) Notice: Subject to any disclaimer, the term of this patent is extended or adjusted under 35 U.S.C. 154(b) by 869 days.

(21) Appl. No.: 15/208,017

(22) Filed: Jul. 12, 2016

(65) Prior Publication Data
US 2018/0018002 A1 Jan. 18, 2018

(51) Int. Cl.
*G06F 17/50* (2006.01)
*G06F 1/20* (2006.01)

(52) U.S. Cl.
CPC .............. *G06F 1/206* (2013.01); *Y02D 10/00* (2018.01)

(58) Field of Classification Search
CPC ........ G06F 1/206; G06F 1/3203; G06F 30/20; G06F 2119/08; G06F 1/3206; G06F 9/4893; G06F 2119/06
See application file for complete search history.

(56) References Cited

U.S. PATENT DOCUMENTS

| | | | |
|---|---|---|---|
| 9,436,491 B1 | 9/2016 | Chiou | |
| 9,535,874 B2* | 1/2017 | Saint-Hilaire | ........ H04L 67/125 |
| 10,222,843 B1* | 3/2019 | Lin | ........... G06F 1/20 |
| 2006/0291160 A1* | 12/2006 | Freeman | ............... F04D 27/001 |
| | | | 361/679.48 |
| 2009/0077508 A1* | 3/2009 | Rubin | ............ G01R 31/318357 |
| | | | 716/136 |
| 2010/0205600 A1 | 8/2010 | Tu | |

(Continued)

OTHER PUBLICATIONS

Zhang et al. Real Time Thermal Management Controller for Data Center IEEE 2014 (Year: 2014).*

(Continued)

*Primary Examiner* — Rehana Perveen
*Assistant Examiner* — Cuong V Luu
(74) *Attorney, Agent, or Firm* — Locke Lord LLP; Tim Tingkang Xia, Esq.

(57) ABSTRACT

Certain aspects direct to systems and methods for platform simulation for development projects of a management controller, such as a baseboard management controller (BMC). The management controller stores a firmware module and a simulator module. The firmware module is supposed to receive thermal output signals from cooling zones of a computing device. The simulator module is a software implemented module used to simulate the cooling zones, by generating the thermal output signals of the cooling zones based on configuration data stored in a data store, and sending the simulated thermal output signals to the firmware module for development and testing purposes.

20 Claims, 8 Drawing Sheets
(3 of 8 Drawing Sheet(s) Filed in Color)

(56) References Cited

U.S. PATENT DOCUMENTS

| | | | |
|---|---|---|---|
| 2010/0287018 A1* | 11/2010 | Shrivastava | G06F 17/509 703/1 |
| 2011/0016342 A1* | 1/2011 | Rowan | G06F 11/3006 713/340 |
| 2011/0077795 A1* | 3/2011 | VanGilder | G06F 1/206 700/300 |
| 2011/0202655 A1* | 8/2011 | Sharma | G06Q 10/06 709/224 |
| 2012/0259469 A1* | 10/2012 | Ward | G05B 15/02 700/276 |
| 2012/0271481 A1* | 10/2012 | Anderson | G06F 1/206 700/299 |
| 2014/0105244 A1* | 4/2014 | Moore | G06F 1/206 374/102 |
| 2014/0277750 A1* | 9/2014 | Artman | G05B 15/02 700/275 |
| 2014/0278333 A1* | 9/2014 | Gupta | H04L 41/145 703/18 |
| 2014/0371924 A1* | 12/2014 | Kodama | G06F 1/20 700/276 |
| 2015/0100299 A1 | 4/2015 | Abraham | |
| 2015/0331694 A1 | 11/2015 | Balakrishnan | |
| 2016/0210569 A1* | 7/2016 | Enck | G06Q 10/0637 |
| 2016/0274629 A1* | 9/2016 | Lovicott | G06F 1/206 |
| 2017/0094833 A1* | 3/2017 | Pitwon | H05K 7/20145 |
| 2017/0220362 A1* | 8/2017 | Jenne | G06F 1/26 |
| 2018/0035572 A1* | 2/2018 | Song | H05K 7/20836 |

OTHER PUBLICATIONS

EP2607987 (Year: 2013).*

Dot Hill AssuredSAN Event Descriptions Reference Guide Jan. 2016 (Year: 2016).*

* cited by examiner

THERMAL SIMULATION FOR MANAGEMENT CONTROLLER DEVELOPMENT PROJECTS

CROSS-REFERENCE TO RELATED PATENT APPLICATION

This application relates to co-pending U.S. patent application Ser. No. 15/207,905, entitled "PLATFORM SIMULATION FOR MANAGEMENT CONTROLLER DEVELOPMENT PROJECTS" and filed on Jul. 12, 2016. The entire content of the above identified applications are incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to management controller technology, and more particularly to systems and methods for thermal simulation for development projects of a management controller, such as a baseboard management controller (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Baseboard management controller (BMC) development projects have dependency on hardware. The cost of pre-production hardware can be very high, and BMC developers have to share available machines. Specifically, the thermal modules require a long time to stabilize because of dependency on different hardware components.

Therefore, an unaddressed need exists in the art to address the aforementioned deficiencies and inadequacies.

SUMMARY

Certain aspects of the present disclosure direct to a system, which includes a management controller. The management controller includes a processor and a storage device storing computer executable code. The computer executable code includes a firmware module and a simulator module. The firmware module, when executed at the processor, is configured to receive at least one thermal output signal from at least one cooling zone of a computing device. The simulator module, when executed at the processor, is configured to simulate the at least one cooling zone by: generating the at least one thermal output signal based on configuration data of the at least one cooling zone; and sending the at least one thermal output signal to the firmware module.

In certain embodiments, the management controller is a baseboard management controller (BMC).

In certain embodiments, the firmware module includes a library module storing a plurality of library programs for the at least one cooling zone.

In certain embodiments, the simulator module includes: a data store storing the configuration data of the at least one cooling zone; and at least one simulator library sub-module, each configured to simulate one of the at least one cooling zone by: receiving a request from one of the library programs of the library module; generating the at least one thermal output signal as a response to the request for the at least one cooling zone based on the configuration data stored in the data store; and sending the response to the library module.

In certain embodiments, the configuration data includes: at least one thermal algorithm for the at least one cooling zone; at least one master profile of the at least one cooling zone; and at least one parameter profile corresponding to at least one parameter of at least one device connected to the computing device, room or air flow path within each of the at least one cooling zone of the computing device, or an environment external to the cooling zone.

In certain embodiments, each of the parameters is a static value, a random value within a range, a value obtained from one or more patterns, a value derived from a function of another set of variables, a value set by an administrator, a time-based value, or a value picked from a socket server.

In certain embodiments, the at least one device connected to the computing device includes: a voltage sensor; a computer tachometer sensor; an Inter-Integrated Circuit (I2C) device; a power supply unit (PSU); a complex programmable logic device (CPLD); a field-replaceable unit (FRU); a Redundant Array of Independent Disks (RAID) controller; a RAID-on-chip (ROC); a network interface card (NIC); a satellite management controller; an interface connected to the satellite management controller; a system interface; a universal serial bus (USB) interface; and a Host Embedded Controller Interface (HECI).

Certain aspects of the present disclosure direct to a method for thermal simulation for development projects of a management controller, including: providing a simulator module in the management controller to simulate thermal features of at least one cooling zone of a computing device, where a firmware module of the management controller is configured to receive the at least one thermal output signal from the at least one cooling zone; generating at least one thermal output signal based on configuration data of the at least one cooling zone; and sending the at least one thermal output signal to the firmware module.

In certain embodiments, the management controller is a BMC.

In certain embodiments, the firmware module includes a library module storing a plurality of library programs for the at least one cooling zone. In certain embodiments, the simulator module includes: a data store storing the configuration data of the at least one cooling zone; and at least one simulator library sub-module, each configured to simulate one of the at least one cooling zone by: receiving a request from one of the library programs of the library module; generating the at least one thermal output signal as a response to the request for the at least one cooling zone based on the configuration data stored in the data store; and sending the response to the library module.

In certain embodiments, the configuration data includes: at least one thermal algorithm for the at least one cooling zone; at least one master profile of the at least one cooling zone; and at least one parameter profile corresponding to at least one parameter of at least one device connected to the computing device, room or air flow path within each of the at least one cooling zone of the computing device, or an environment external to the cooling zone.

In certain embodiments, each of the parameters is a static value, a random value within a range, a value obtained from one or more patterns, a value derived from a function of another set of variables, a value set by an administrator, a time-based value, or a value picked from a socket server.

In certain embodiments, the at least one device within a cooling zone includes: a voltage sensor; a computer tachometer sensor; an I2C device; a PSU; a CPLD; a FRU; a RAID controller, a ROC; a NIC; a satellite management controller; an interface connected to the satellite management controller; a system interface; a USB interface; and a HECI.

Certain aspects of the present disclosure direct to a non-transitory computer readable medium storing computer executable code, wherein the computer executable code, when executed at a processor of an management controller, is configured to: simulate thermal features of cooling zones of a computing device, where a firmware module of the management controller is configured to receive the at least one thermal output signal from the cooling zones of the computing device or from the at least one device connected to the computing device; generate at least one thermal output signal based on configuration data of the cooling zones of the computing device or the device connected to the computing device; and send the at least one output signal to the firmware module.

In certain embodiments, the management controller is a BMC.

In certain embodiments, the firmware module includes a library module storing a plurality of library programs for the cooling zones of the computing device and the at least one device connected to the computing device. In certain embodiments, the simulator module includes: a data store storing the configuration data of the cooling zones of the computing device or the device connected to the computing device; at least one simulator library sub-module, each configured to simulate one of cooling zones by: receiving a request from one of the library programs of the library module; generating the at least one thermal output signal as a response to the request for the at least one cooling zone based on the configuration data stored in the data store; and sending the response to the library module.

In certain embodiments, the configuration data includes: at least one thermal algorithm for the at least one cooling zone; at least one master profile of the at least one cooling zone; and at least one parameter profile corresponding to at least one parameter of at least one device connected to the computing device, room or air flow path within each of the at least one cooling zone of the computing device, or an environment external to the cooling zone.

In certain embodiments, each of the parameters is a static value, a random value within a range, a value obtained from one or more patterns, a value derived from a function of another set of variables, a value set by an administrator, a time-based value, or a value picked from a socket server.

In certain embodiments, the at least one device within a cooling zone includes: a voltage sensor; a computer tachometer sensor; an I2C device; a PSU; a CPLD; a FRU; a RAID controller, a ROC; a NIC; a satellite management controller; an interface connected to the satellite management controller; a system interface; a USB interface; and a HECI.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

The present disclosure will become more fully understood from the detailed description and the accompanying drawings, wherein.

DETAILED DESCRIPTION

Figure 1:
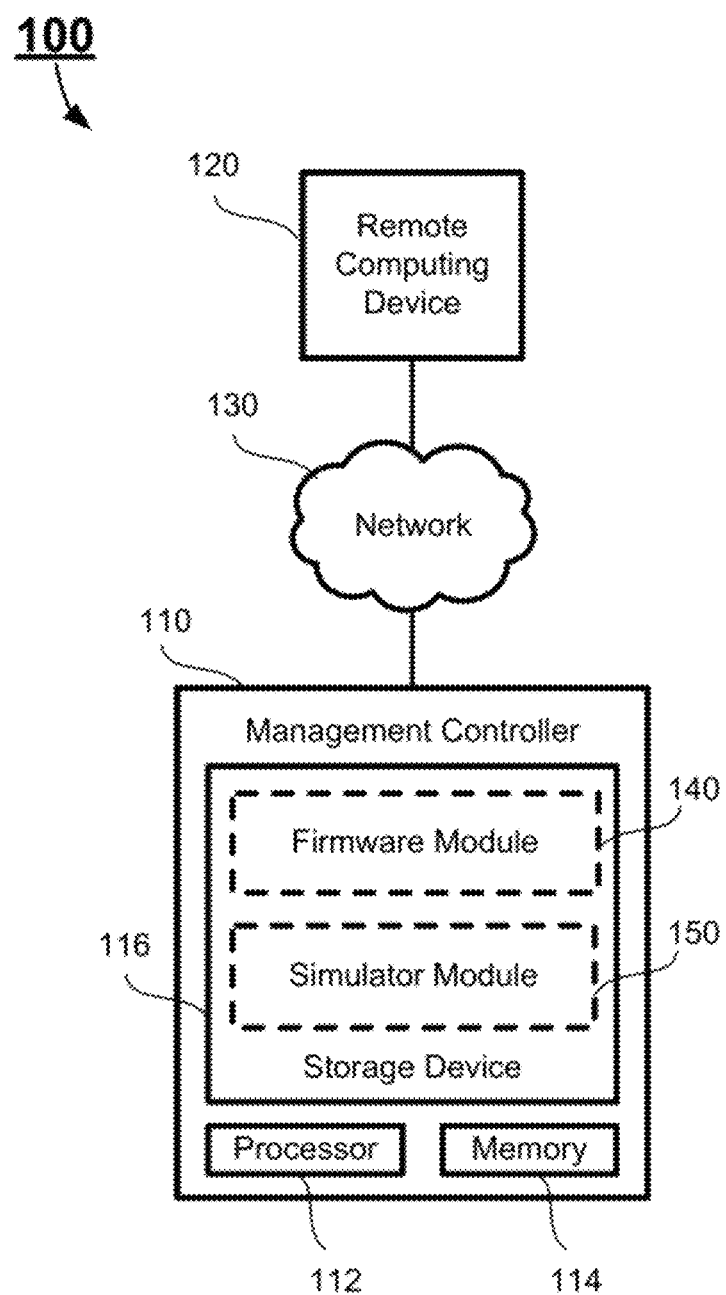
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on the BMC. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for thermal simulation for management controller development projects. As discussed above, BMC development projects have dependency on hardware. Specifically, the thermal modules require a long time to stabilize because of dependency on different hardware components. Prior to the actual hardware related to the thermal modules being available, there must be a way to provide early opportunities for development and testing related to the thermal modules. Therefore, the systems and methods for thermal simulation for BMC development can provide a cost effective solution.

FIG. 1 schematically depicts an exemplary system according to certain embodiments of the present disclosure. As shown in FIG. 1, the system 100 includes a management controller 110, which is specifically configured to perform the thermal simulation. Optionally, the system 100 may further include a remote computing device 120, which is communicatively connected to the management controller 110 via a network 130, such that an administrator may remotely control the management controller 110 through the remote computing device 120. For example, the remote computing device 130 may allow an administrator/user to input data as part of or basis for deriving to the simulated thermal data to the management controller 110. In certain embodiments, the network 130 may be a wired or wireless network, and may be of various forms. Examples of the network 130 may include, but is not limited to, a local area network (LAN), a wide area network (WAN) including the Internet, or any other type of networks.

The management controller 110 is a specialized microcontroller configured to manage thermal sensors in the platform hardware devices, and system management software components. In certain embodiments, the management controller 110 may be a BMC used for baseboard management purposes. Alternatively, the management controller 110 may be a management controller for other purposes, such as temperature monitoring, chassis management, rack management, virtual machine management or other type of management purposes. In certain embodiments, the management controller 110 may be an embedded controller on the motherboard or the baseboard of a computing device, and different types of sensors can be built into the computing device. The management controller 110 may read these sensors to obtain parameters such as temperature, cooling fan speeds, power status, operating system (OS) status, etc. The management controller 110 may monitor the sensors and send alerts to a system administrator at the remote computing device 120 via the network 130 if any of the parameters do not stay within preset limits, indicating a potential failure of the system. The administrator may also remotely communicate with the management controller 110 from the remote computing device 120 to take some action, such as setting fan speed of CPU or PSU, adjusting system load or CPU load, or resetting or power cycling the system to get a hung OS running again. Examples of the features that the management controller 110 may monitor include: sensor monitoring, firmware update of the PSU, the CPLD, or other out-of-band (OOB) devices, protocols such as Management Component Transport Protocol (MCTP), interfacing with satellite management controllers or other devices behind the satellite management controllers, interface channels such as the keyboard controller style (KCS) interface or other system interfaces, the universal serial bus (USB) interface and the Host Embedded Controller Interface (HECI), and integrated behavior such as PSU power based on specific component composition and system load. Further, other features of the management controller 110 may include: system event log (SEL), platform event filtering (PEF), boundary conditions, invalid values from the devices, unexpected size of data from the devices, delays from the devices, and unexpected restart of the devices, losing the state of the machines in transactions.

As shown in FIG. 1, the management controller 110 includes a processor 112, a memory 114, and a storage device 116. Further, the management controller 110 may include other hardware components and software components (not shown) to perform its corresponding tasks. For example, the management controller 110 may include a network interface, such as a network interface card (NIC), which is used to connect the management controller 110 to the network 130. Other examples of these hardware and software components of the management controller 110 may include, but not limited to, other required memory, interfaces, buses, Input/Output (I/O) modules and peripheral devices.

The processor 112 is configured to control operation of the management controller 110. In certain embodiments, the processor 112 may be a central processing unit (CPU). The processor 112 can execute any computer executable code or instructions, such as the firmware module 140 and the simulator module 150 of the management controller 110 or other applications and instructions of the BMC 110. In certain embodiments, the management controller 110 may run on more than one processor, such as two processors, four processors, eight processors, or any suitable number of processors.

The memory 114 can be a volatile memory, such as the random-access memory (RAM), for storing the data and information during the operation of the management controller 110. In certain embodiments, the memory 114 may be a volatile memory array. In certain embodiments, the management controller 110 may run on more than one memory 114.

The storage device 116 is a non-volatile data storage media for storing computer executable code or instructions for performing the operation of the management controller 110. In certain embodiments, the computer executable code or instructions of the management controller 110 may be implemented as one or more application programs or modules. Examples of the storage device 116 may include non-volatile memory such as flash memory, memory cards, USB drives, hard drives, floppy disks, optical drives, or any other types of data storage devices. In certain embodiments, the management controller 110 may have multiple storage devices 116, which may be identical storage devices or different types of storage devices, and the firmware module 140, the simulator module 150, and other applications of the management controller 110 may be stored in one or more of the storage devices 116 of the management controller 110.

As shown in FIG. 1, the applications stored in the storage device 116 include the firmware module 140 and the simulator module 150. As discussed above, each of the firmware module 140 and the simulator module 150 may be formed by the computer executable code or instructions executable at the processor 112. In certain embodiments, each of the firmware module 140 and the simulator module 150 may further include sub-modules. Alternatively, in certain embodiments, the firmware module 140 and the simulator module 150 may be combined to form a single module. In certain embodiments, the storage device 116 may store other applications independent from the firmware module 140 and the simulator module 150.

The firmware module 140 may include a plurality of modules or sub-modules, which may respectively be implemented by computer executable codes or instructions to collectively form the firmware module 140. In certain embodiments, at least one device in communication with the management controller 110, such as CPU, PSU, CPU fan or PSU fan, rooms neighboring, near or between the devices, and/or air flow paths may constitute a cooling zone, and one or more thermal sensors monitored by the management controller 110 may correspond to one of a plurality of cooling zones. In certain embodiments, the firmware module 140 may include applications for monitoring the various features of at least one cooling zone encompassing a computing device, which the management controller 110 is supposed to be connected to. Examples of the features of the computing device encompassed by a cooling zone may include, without being limited to, thermal sensors, components or modules, or any other features that may be managed or monitored by the management controller 110. In operation, the firmware module 140 may receive the corresponding thermal data from the features of the computing device being monitored (or from the simulator module 150). In certain embodiments, the devices, rooms, and/or air flow paths within a cooling zone may be partly or entirely shared with, or entirely excluded from another cooling zone. In certain embodiments, different firmware modules or sub-modules of the firmware module 140 may respectively receive the corresponding data simultaneously. The firmware module 140 may further generate test result based on the data received, and send the test result back to the corresponding features of the cooling zones being monitored (or to the simulator module 150). In certain embodiments, the firmware module 140 may include other applications necessary for the operation of the management controller 110.

The simulator module 150 is configured to simulate a plurality of features, including the thermal features of a plurality of cooling zones, and send the simulated thermal features to the thermal sensors monitored by the management controller. As discussed above, the management controller 110 may be used to monitor and manage certain thermal features of the cooling zones encompassing devices. In the management controller development projects, there may be required thermal tests to be performed under coordination of different devices. For example, the thermal feature of a cooling zone may be tested for a scenario when a CPU is overloaded and fans fail. Generally, in the management controller development projects, the SOC vendors may provide development boards (also referred to as the evaluation boards or "eval boards"), which may be used in a laboratory environment to perform development and testing purposes. In some cases, older computer platforms may be available as needed and used for new development. In certain embodiments, the devices involved in the tests may be simulated by the simulator module 150.

In certain embodiments, the simulator module 150 may include one or more thermal algorithms, master profiles corresponding to cooling zones, and parameter profiles corresponding to parameters of devices, rooms neighboring, near or between the devices and air flow paths, which contain the detailed information of the thermal features of the cooling zones and the components included in the cooling zones for thermal simulation.

In certain embodiments, the simulator module 150 may obtain thermal data typically generated within the cooling zones, and send the thermal data to the firmware module 140, so as to test and develop the management controller 110 without dependency on physical devices. In certain embodiments, the simulator module 150 may further receive the response from the firmware module 140, and then obtain further thermal data to be sent to the firmware module 140 based on the response from the firmware 140.

Figure 2:
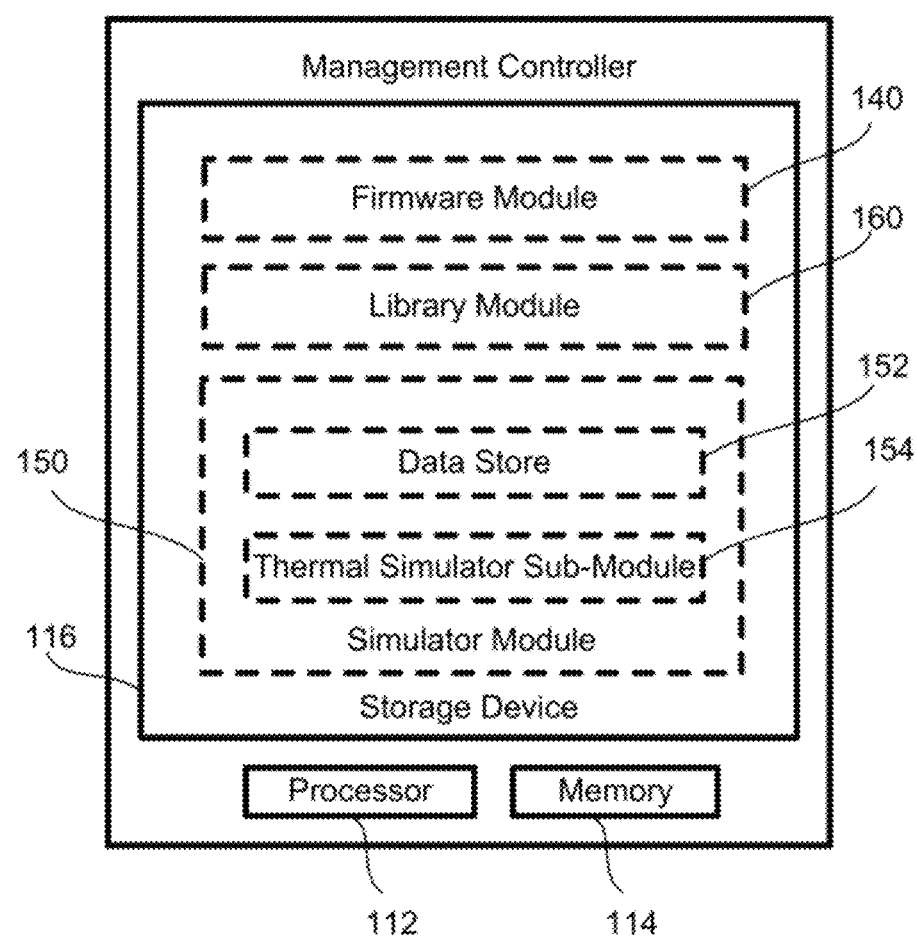
FIG. 2 schematically depicts a management controller of the system according to certain embodiments of the present disclosure.

FIG. 2 schematically depicts a management controller of the system according to certain embodiments of the present disclosure. As shown in FIG. 2, in addition to the firmware module 140 and the simulator module 150, the applications stored in the storage device 116 further include a library module 160. Further, the simulator module 150 of the management controller 110 includes a plurality of sub-modules, such as a data store 152, and a thermal simulator sub-module 154.

The library module 160 is a module storing a plurality of library programs used for development purposes. In certain embodiments, the library programs of the library module 160 may include configuration information of the management controller 110, documentation, help data, message templates, pre-written code and subroutines, classes, values or type specifications, or any other data necessary for the development projects. Each of the library programs of the library module 160 may correspond to one or more actions for communicating with the features, such as thermal features of the cooling zones and hardware or software components within the cooling zones, being monitored by the management controller 110. For example, some of the library programs of the library module 160 may be in charge of the read/write process to certain features or devices. In certain embodiments, the library programs of the library module 160 may be a part of the firmware module 140, or may be separate from the firmware module 160. It should be noted that, although FIG. 2 shows the library module 160 as a collective module of the library programs, each library program may be independent and separate from one another, and may be stored in different locations and executed independently in different threads.

The data store 152 is a database which stores thermal algorithms, master profiles of the cooling zones, and parameter profiles of parameters of the devices, rooms and/or air flow paths within cooling zones, and/or parameters of environment external of a cooling zone. In certain embodiments, the data store 152 may be modified to support the read/write processes by the library programs of the library module 160. In certain embodiments, the values of parameter files of the devices and rooms may include parameter values, and each of the parameter values may be a static value or a random value within a range. In certain embodiments, the parameter values may be obtained from patterns, or derived from a function of another set of variables. In certain embodiments, the device values may be values set by administrators/users through the remote computing device 120, time-based values based on different time of a day, or values picked from a socket server located locally in the management controller 110 or from a remote machine (which may be the remote computing device 120, or may be another remote computer not shown in the figures). For example, values of CPU load can be changed by an administrator/user through the remote computing device 120 to be 100% to aid studying of the response speed of the system.

In certain embodiments, the thermal algorithms may include, without being limited to: (1) heat flow out algorithms, each calculating the heat flowing out of a cooling zone, and may be a function of a set of variables including fan speed, air flow path, temperature in the cooling zone at time of t, and temperature in the external environment; (2) heat buildup algorithms, each calculating the heat building up in a cooling zone, and may be a function of a set of variables including a value of a heat flow out algorithm, and power consumed in the cooling zone; and (3) zone temperature algorithms, each calculating the temperature at time of t+1 in the cooling zone, and may be a function of a set of variables of the cooling zone at time of t, the mass of the devices within the cooling zone, and a value of the Heat Buildup algorithm.

In certain embodiments, the algorithms can be heuristic functions. In certain embodiments, the master profile of a cooling zone provides the detailed information of the cooling zone, including but not limited to, the default temperature, the types and identities of the devices, rooms, and/or the air flow paths within the cooling zone. In certain embodiments, the parameter profiles provide values of the parameters of the devices, rooms, air flow paths, and the external environment, such as load, fan speed, power consumption, existence, mass, functionality, temperature, and other features thereof. For example, the parameter profiles of a CPU may respectively correspond to the parameters of the CPU, including but not limited to, load, power consumption, existence, mass and functionality, and other features of the CPU; the parameter profiles of a CPU fan may respectively correspond to fan speed, power consumption, existence, mass and functionality, and other features of the CPU fan; a parameter of the external environment may correspond to the temperature value of the environment external to at least one of the cooling zones.

The thermal simulator sub-module 154 is a sub-module to simulate the thermal features of the cooling zones. In certain embodiments, the simulation of the thermal simulator sub-module 154 is performed based on the thermal algorithms, cooling zone master profiles, parameter profiles stored in the data store 152. In certain embodiments, in response to an action or a request from the library module 160 that is supposed to be sent to certain thermal sensors within a cooling zone, the thermal simulator sub-module 154 may simulate a corresponding response of the thermal sensors based on the corresponding thermal algorithms, cooling zone master profiles, parameter profiles parameter files for the cooling zone stored in the data store 152. In certain embodiments, based on the thermal algorithms, thermal simulator 154 may refer to look up tables associating with the master profiles and the parameter files for thermal calculation and simulation. For example, the thermal simulator sub-module 154 may simulate a temperature value of a first cooling zone by referring to a master profile of the first cooling zone to determine the devices, rooms, air flow paths within the first cooling zone, referring to the parameter profiles of the devices, rooms, air flow paths to obtain the parameter values of the devices, rooms, air flow paths within the first cooling zone, and referring to the heat flow out, heat buildup and zone temperature algorithms to calculate the temperature value of first cooling zone, and simulate a response containing the simulated temperature value as needed by the thermal sensors within the first cooling zone. In response to generating the simulated temperature value, the thermal simulator sub-module 154 sends the response containing the simulated temperature value to the firmware module 140 through the library module 160 for BMC testing and developing.

In certain embodiments, the thermal simulator module 154 may simulate a temperature value of a cooling zone encompassing certain devices/rooms/air flow paths, by referring to the parameter files of a CPU load being 100%. In response to generating the simulated temperature value, the thermal simulating module 154 sends a response containing the simulated temperature value to the firmware module 140 through the library module 160 for BMC testing, developing and evaluating for response speed and oscillation of temperature value.

In certain embodiments, the thermal simulating module 154 may simulate a temperature value by referring to the parameter files indicating a system load being high and PSUs being overloaded. In response to generating the simulated temperature value, the thermal simulating module 154 sends a response containing the simulated temperature value to the firmware module 140 through the library module 160 for evaluating sorts of coordinated system actions such as power capping or host power down.

In certain embodiments, the thermal simulating module 154 may simulate a temperature value by referring to the parameter files corresponding to scenarios such as chassis intrusion, missing fans, fan failure, PSU fan failure, or ROC communication failure, so that the firmware module 140, in response to receiving a series of temperature values across a period of time, may test and develop BMC under the scenarios.

In certain embodiments, the thermal simulating module 154 may simulate a temperature value by referring to the thermal algorithms that are developed for simulating temperature values under a condition of sudden change in system load, CPU load, PSU load, load of a component in the system, or stress conditions to the devices and/or the system within a cooling zone. In response to generating the simulated temperature value, the thermal simulating module 154 sends a response containing the simulated temperature value to the firmware module 140 through the library module 160 for developing and evaluating of the response time and/or the fan oscillations of the BMC.

In certain embodiments, the thermal simulator sub-module 154 may simulate for thermal features of cooling zones encompassing intelligent devices such as satellite controllers, PSUs, NIC, RAID, CPLD by referring to the data store 152 or to the socket server. In certain embodiments, the simulator library sub-module 154 may simulate thermal features of cooling zones encompassing devices behind satellite controllers, which are accessed by bridging, by referring to the data library 152 for bridge command for the devices and execute the command. In certain embodiments, more than one thermal simulator sub-module 154 may co-exist to simulate the thermal features of cooling zones each encompass different intelligent devices.

In operation, each of the sub-modules of the simulator module 150 may be independently executed in different threads such that each of the sub-modules may independently simulate the corresponding feature. In certain embodiments, the data store 152 may be modified to support the read/write processes by the sub-modules of the simulator module 150. For example, for a specific cooling zone, the sub-module corresponding to the cooling zone will be coded such that the read/write process to the cooling zone will reference to the cooling zone master profile stored in the data store 152 that corresponds to the cooling zone. Thus, in the simulating process, the sub-module will retrieve the master profile, and then generate a response as needed for the simulated thermal feature of the cooling zone based on the master profile.

Figure 3:
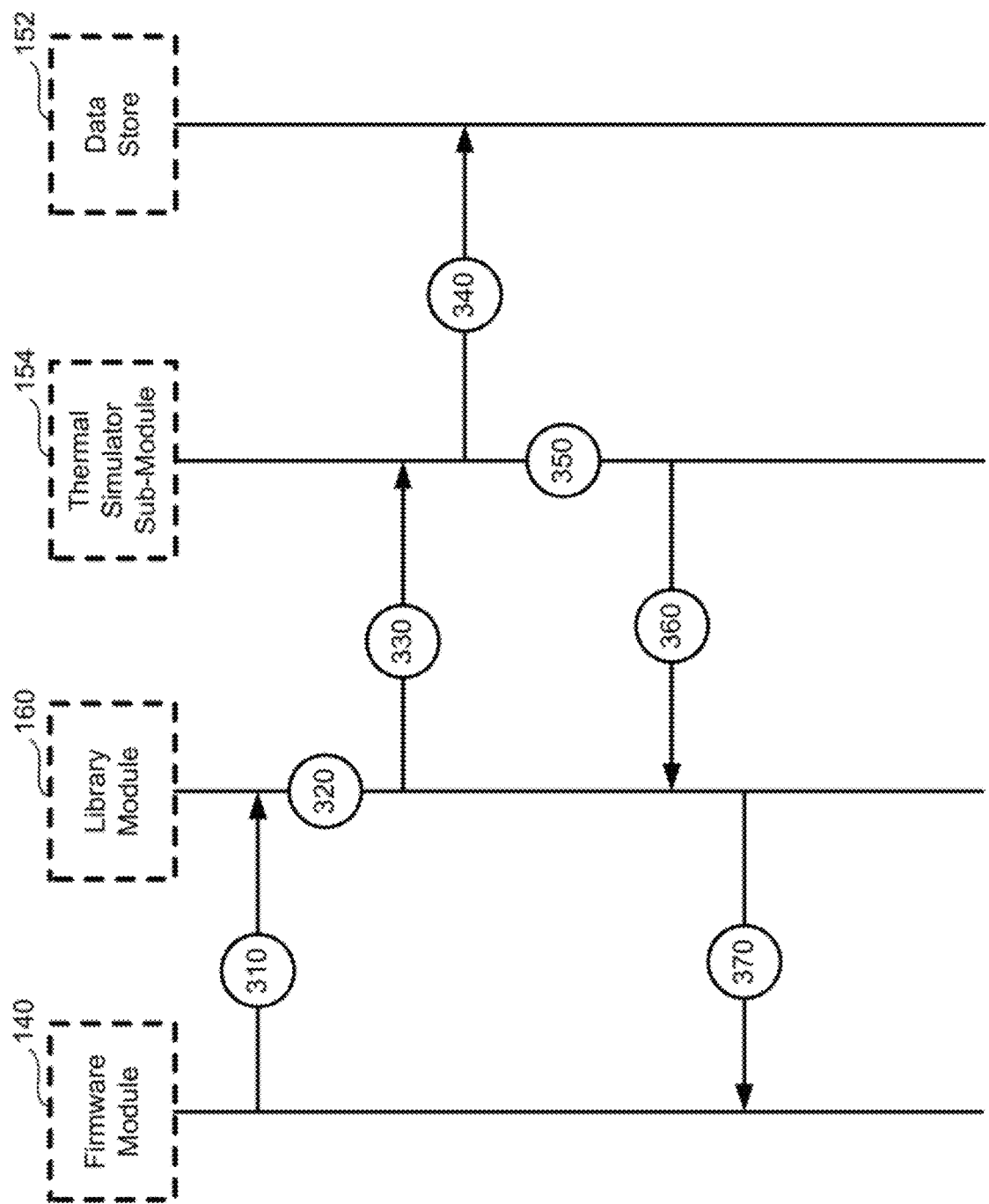
FIG. 3 depicts operation of a thermal simulator sub-module of a simulator module of a management controller of the system according to certain embodiments of the present disclosure.

FIG. 3 depicts operation of the thermal simulator sub-module of a simulator module of a management controller of the system according to certain embodiments of the present disclosure. As described above, the thermal simulator sub-module 154 simulates the thermal features of cooling zones encompassing the computing device or the devices connected to the devices. When the thermal simulator sub-module 154 is used to simulate the thermal features of cooling zones, any request being intended for the cooing zones will be forwarded to the thermal simulator sub-module 154. As shown in FIG. 3, when the management controller 110 intends to send a request for a thermal feature of a cooling zone, at procedure 310, the firmware module 140 communicates with the library module 160 to select a corresponding library program in the library module 160 for the request. At procedure 320, the library program of the library module 160 is selected and executed to generate the request for the cooling zone. Since the thermal features are now simulated by the thermal simulator sub-module 154, at procedure 330, the request is sent to the thermal simulator sub-module 154. In response to the request, at procedure 340, the thermal simulator sub-module 154 retrieves the corresponding thermal algorithms, master profile, and parameter profiles of the cooling zone from the data store 152. At procedure 350, the thermal simulator sub-module 154 generates a response to the request based on the thermal algorithms, master profile, parameter profiles retrieved from the data store 152. At procedure 360, the thermal simulator sub-module 154 sends the response back to the library module 160. At procedure 370, the library program of the library module 160 sends the response back to the firmware module 140.

In certain embodiments, the simulator module 150 may include more than one of the thermal simulator sub-module 154, based on the number of the thermal features and cooling zones to be simulated and tested. For example, the thermal features and/or cooling zones being simulated by the sub-modules may each correspond to and include, without being limited to, different devices such as a voltage sensor; a computer tachometer sensor; an Inter-Integrated Circuit (I2C) device; a PSU; a CPLD; a FSU; a RAID controller; a RAID-on-chip (ROC); a NIC; a satellite management controller; an interface connected to the satellite management controller; a system interface; a USB interface; and a HECI.

Figure 4:
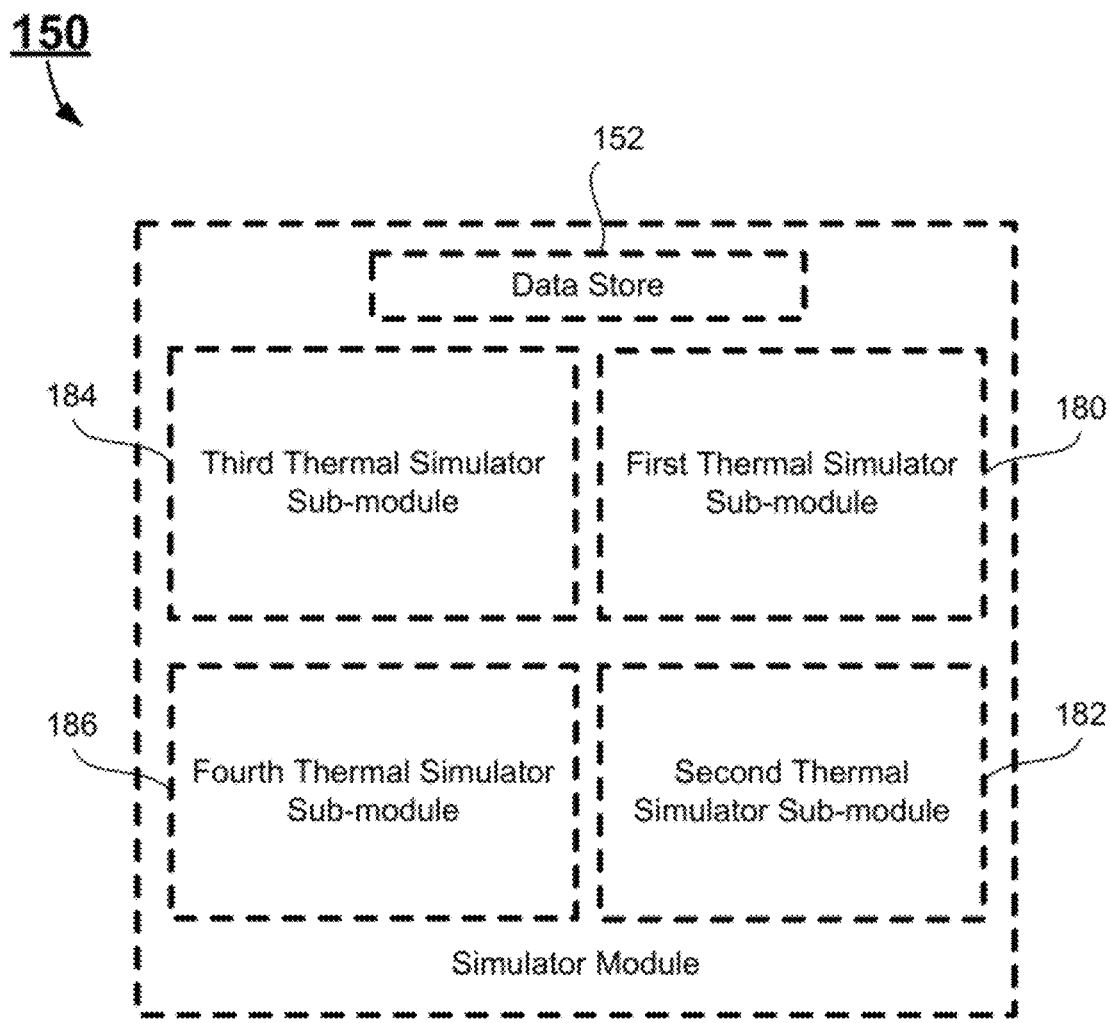
FIG. 4 schematically depicts the sub-modules of a simulator module of a management controller of the system according to certain embodiments of the present disclosure.

FIG. 4 schematically depicts the sub-modules of a simulator module of a management controller of the system according to certain embodiments of the present disclosure. In certain embodiments, each of the sub-modules may further include sub-modules or units. As shown in FIG. 4, the simulator module 150 includes a plurality of sub-modules, including a first thermal simulator sub-module 180, a second simulator sub-module 182, a third simulator sub-module 184, and a fourth simulator sub-module 186. Each of the simulator sub-modules 180, 182, 184 and 186 may correspond to a cooling zone of a computing device being simulated. In certain embodiments, a cooling zone may encompass all of the components of the computing device being simulated, including the devices, rooms, and/or air flow paths of a computing device. Alternatively, a cooling zone may encompass only some of devices, rooms, and/or air flow paths of the computing device. For example, a cooling zone may encompass some of the devices being connected to the computing device, and the air flow paths within or between the devices. In certain embodiments, a cooling zone may be formed by multiple cooling zones.

Referring to FIG. 4, the first thermal simulator sub-module 180 corresponds to a first cooling zone encompassing certain devices, rooms and/or airflow paths of the computing device, and the second thermal simulator sub-module 182 corresponds to a second cooling zone encompassing certain devices, rooms and/or airflow paths of the computing device. The second cooling zone is independent from and thus does not overlap with the first cooling zone. Further, the third thermal simulator sub-module 184 corresponds to a third cooling zone encompassing all the devices, rooms and/or airflow paths in the first and second cooling zones. In other words, the third cooling zone is a combination of the first and second cooling zones. Moreover, the fourth thermal simulator sub-module 186 corresponds to a fourth cooling zone encompassing all the devices, rooms and/or airflow paths of the third cooling zone and certain devices, rooms and/or airflow paths of research interest. In certain embodiments, the fourth cooling zone may encompass all the devices, rooms and/or airflow paths of the computing device.

The first thermal simulator sub-module 180 is configured to simulate the thermal features of the first cooling zone. In certain embodiments, the first thermal simulator sub-module 180 may simulate a temperature value in the first cooling zone by referring to the thermal algorithm, first cooling zone master profile and parameter files corresponding to the devices, rooms, airflow path in the first cooling zone in the data store 152.

In certain embodiments, the first thermal simulator sub-module 180 may simultaneously refer to the thermal algorithms to calculate the temperature value of the first cooling zone, and refer to first cooling zone master profile to determine the devices, rooms and air flow paths in the first cooling zone. In response to determining the devices, rooms and air flow paths in the first cooling zone, and in response to determining at least one parameter variable is required by the thermal algorithms, such as a total mass of the devices within the first cooling zone, the first thermal simulator sub-module 180 refers to the parameter files of the devices, rooms and air flow paths to retrieve the parameter values of the parameters of the devices, rooms and air flow paths. For example, the first cooling zone may encompass a CPU and a CPU fan, and the first thermal simulator sub-module 180 may calculate the temperature value of the first cooling zone based on the retrieved parameter values including mass of the devices within the first cooling zone, the fan speed of the CPU fan, and the load of the CPU based on the parameter profiles of the CPU and the CPU fan.

In certain embodiments, the parameters such as fan speed, current temperature, zone temperature, external temperature, power consumed in the zone, and other features of the devices, rooms and airflow paths may be generated on logical basis, for example, a simulated value of power consumption can be varied by simple logic, such as based on user-configured values inputted by remote computing device 120, or based on an integrated simulation of the system based on parameters such as host power status, RAID configuration, I/O rate, and the number and the configuration of the drives. Further, the values of the parameters can be configured by a user (e.g., the administrator), changed by the user through the remote computing device 120, and/or programmed to logically generate at run time.

The second thermal simulator sub-module 182 may be configured to simulate the thermal features of the second cooling zone. Accordingly, a user (e.g., the administrator) may compare between the thermal features between the first and second cooling zones and analyze their correlation to the device, room, and air flow path configurations in the respective cooling zones.

The third thermal simulator sub-module 184 may be configured to simulate the thermal features of the third cooling zone. Accordingly, a user (e.g., the administrator) may compare between the third cooling zone with first cooling zone and/or the second cooling zone to analyze whether the combination produces a synergy and the extent thereof in different combinations of cooling zones.

The fourth thermal simulator sub-module 186 may be configured to simulate the thermal features of the fourth cooling zone. Specifically, a user (e.g., the administrator) may compare between the fourth cooling zone with the first, second and third cooling zones to analyze the benefits and/or negative influences resulted from the addition of the particular devices, room and/or air flow paths.

Figure 5:
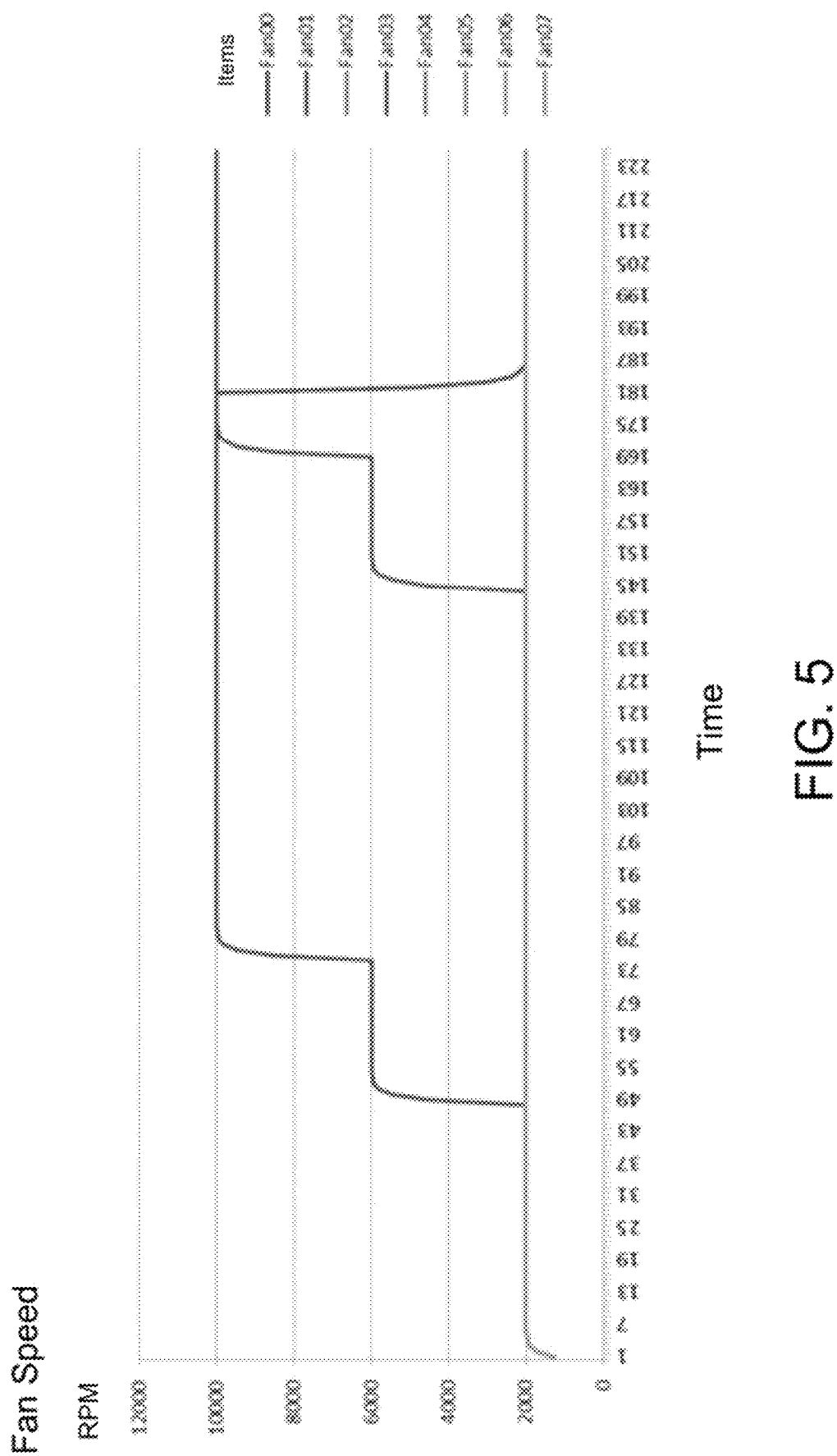
FIG. 5 depicts a diagram of fan speeds according to certain embodiments of the present disclosure.
Figure 6:
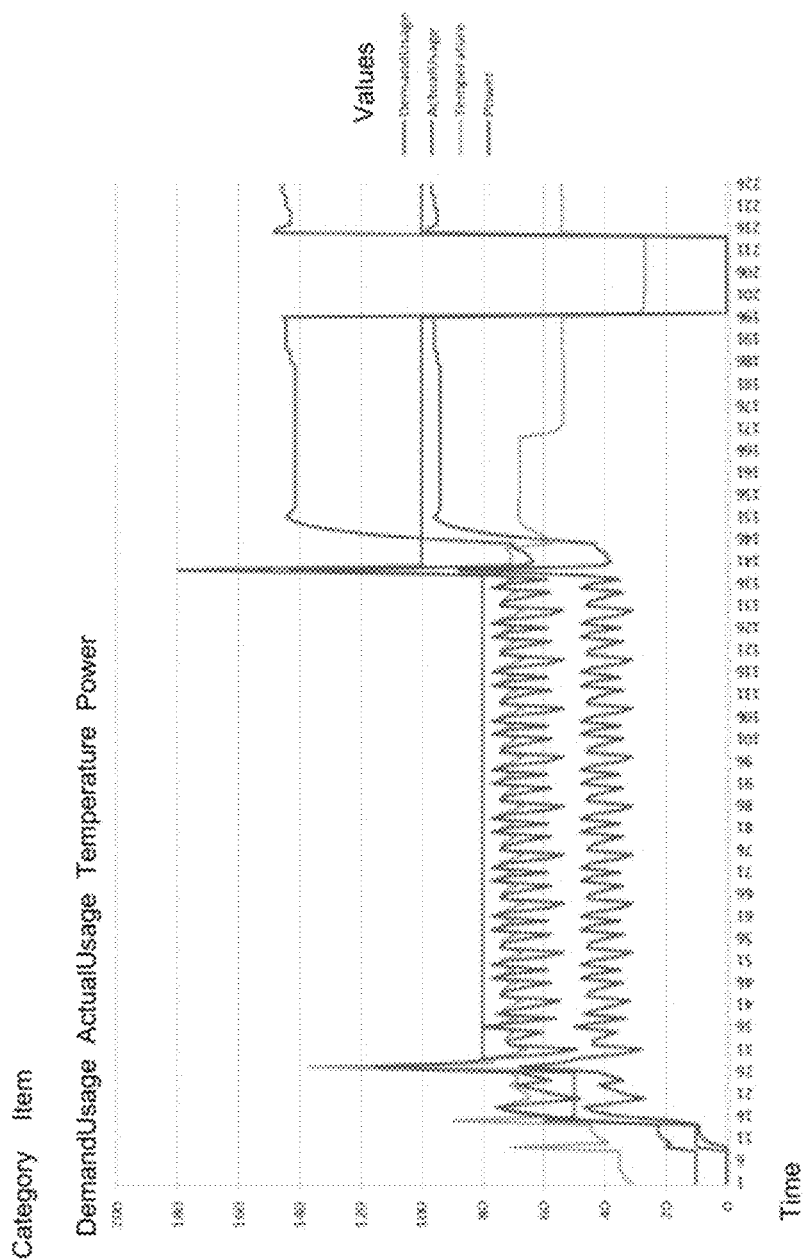
FIG. 6 depicts a diagram of power consumption and its relation to simulated temperature values of a central processing unit (CPU) according to certain embodiments of the present disclosure.
Figure 7:
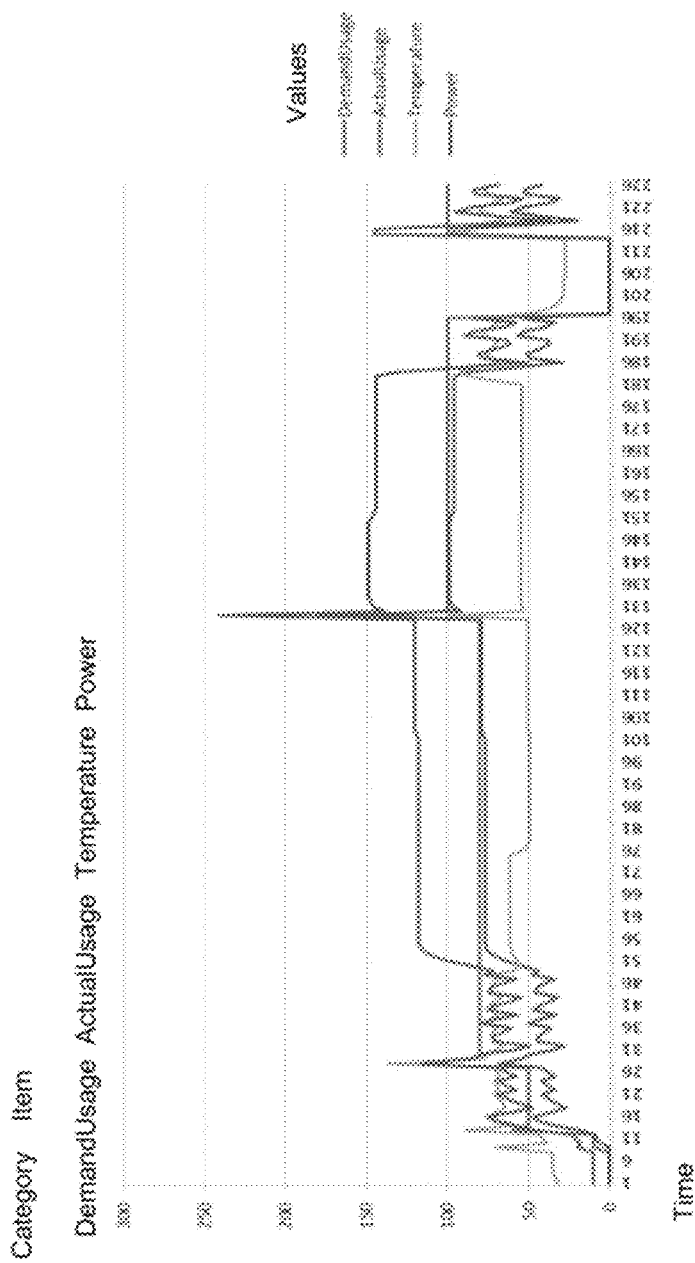
FIG. 7 depicts a diagram of power consumption and its relation to simulated temperature values of a central processing unit (CPU) according to certain embodiments of the present disclosure.

In certain embodiments, the simulator module 150 may also simulate the devices within the cooling zones, and generate one or more output signals for the simulated devices. For example, in certain embodiments, the device being simulated may be thermal sensors, and the output signals may be thermal signals. In certain embodiments, the device being simulated may be one or more CPUs, and the output signals may be power consumptions of the CPUs. In certain embodiments, the device being simulated may be a PSU, and the output signals may be power consumptions of the CPUs. For each of the devices being simulated by the simulator module 150, the output signals may be obtained from the actual output by the actual devices of a computing device, and used in the simulator module 150 for development purposes. In the following examples as shown in FIGS. 5-7, all of the output signals are obtained from devices of an actual computing device as a host computer. For each of the diagrams, the X axis of the diagram is the time, and the Y axis of the diagram is fan speed or voltage value. As shown in FIGS. 6-7, to obtain the output signals for testing purposes, at the time of about 200, the computing device (i.e., the host) is powered off, but the AUX voltages continue to be available.

In certain embodiments, some of the sub-modules of the simulator module 150 may include a command handler, which is used to simulate the commands and responses of the devices simulated by the sub-modules. The command handler receives a command and brokers a result from the appropriate aggregate. The result may be either a successful application of the command, or an exception.

FIG. 5 depicts a diagram of fan speed according to certain embodiments of the present disclosure, where different fan speed generated by different sensors may be simulated by the simulator module 150. The sensors being simulated may be located in different cooling zones. As shown in FIG. 5, for testing purposes, at time of 0, the simulative Fan 07 is powered on, and maintains 2,000 revolutions per minute (RPM) after time of about 5. The simulative Fan 01 is powered on at the time of about 50, and the fan speed of Fan 01 rises to 6,000 RPM during time of about 50 and 75, and further rises to 10,000 RPM during time of about 80 and 185. After time of about 190, the Fan 01 is powered off. The simulative Fan 00 is powered on at the time of about 145, and the fan speed of Fan 00 rises to 6,000 RPM between the time of about 145 and 170, and later rises to 10,000 RPM after time of about 170. When the simulator module 150 generates the fan speeds as the output, the engineer of the development project of the management controller 110 may use the fan speeds to perform tests on the firmware module 140 of the management controller 110.

FIGS. 6 and 7 respectively depict diagrams of simulated power consumption and its relation to simulated thermal features of two different CPUs according to certain embodiments of the present disclosure. Specifically, the data as shown in the diagrams of FIGS. 6 and 7 may be obtained by a computing device having two CPUs (e.g., a CPU 0 and a CPU 1). As described above, for testing purposes, at the time of about 200, the computing device (i.e., the host) is powered off, but the AUX voltages continue to be available. In certain embodiments, when the simulator module 150 generates the power consumption signals and thermal features of the CPUs as the output, the engineer of the development project of the management controller 110 may use the power consumption signals and thermal features to perform tests on the firmware module 140 of the management controller 110.

Figure 8:
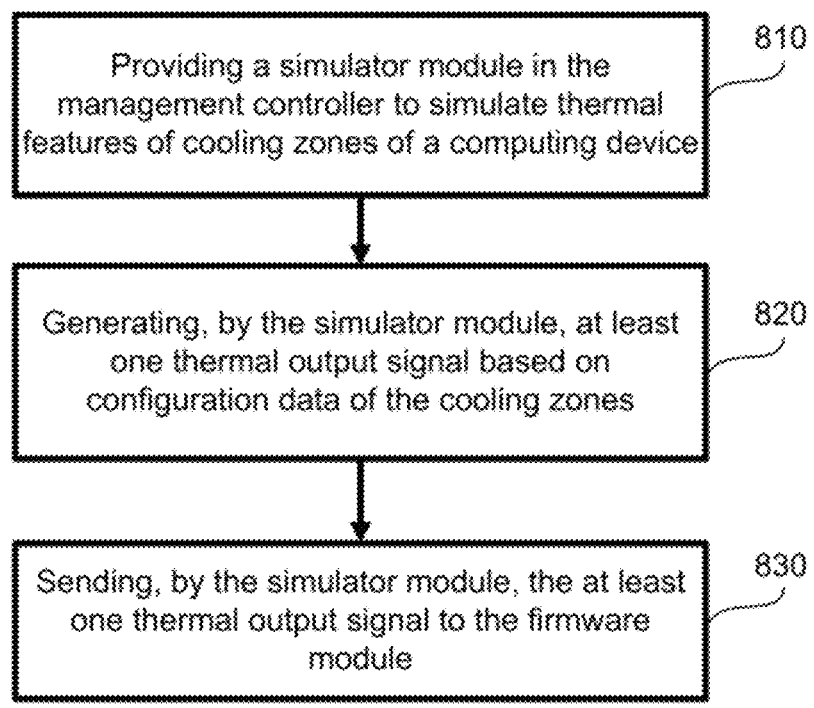
FIG. 8 depicts a flowchart showing a method for thermal simulation for development projects of a management controller according to certain embodiments of the present disclosure.

A further aspect of the present disclosure is directed to a method for platform simulation for development projects of a management controller. FIG. 8 depicts a flowchart showing a method for thermal simulation for development projects of a management controller according to certain embodiments of the present disclosure. In certain embodiments, the method as shown in FIG. 8 may be implemented on a system as shown in FIG. 1. It should be particularly noted that the sequence of the procedures as described in the flowchart as shown in FIG. 8 may vary, and is thus not intended to limit the disclosure thereof.

As shown in FIG. 8, at procedure 810, a simulator module 150 is provided in the management controller 110 to simulate the thermal features of cooling zones encompassing a computing device or at least one device connected to the computing device. Specifically, the firmware module 140 of the management controller 110 is configured to receive at least one thermal output signal from cooling zones encompassing the computing device or from the at least one device connected to the computing device.

At procedure 820, the simulator module 150 generates the at least one thermal output signal based on thermal algorithms, cooling zone master profiles, and parameter profiles of the cooling zones encompassing computing device or the devices connected to the computing device. As discussed above, the thermal algorithms, cooling zone master profiles, and parameter profiles may be stored in the data store 152. In certain embodiments, the simulator module 150 may include one or more sub-modules to simulate one or more devices, and each of the sub-modules may be executed in a different thread such that the sub-modules may run simultaneously. Examples of the sub-modules may include the thermal simulator sub-module 154.

At procedure 830, once the simulator module 150 generates the thermal output signal, the simulator module 150 sends the at least one thermal output signal to the firmware module 140. In certain embodiments, the firmware module 140 may send, through the library module 160, requests to the sub-modules of the simulator module 150, and each of the sub-modules of the simulator module 150 may return the thermal output signal as the response to each of the requests back to the library module 160.

In a further aspect, the present disclosure is related to a non-transitory computer readable medium storing computer executable code. The code, when executed at one or more processer, may perform the method as described above. In certain embodiments, the non-transitory computer readable medium may include, but not limited to, any physical or virtual storage media. In certain embodiments, the non-transitory computer readable medium may be implemented as the storage device 116 of the management controller 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a management controller, comprising a processor and a storage device storing computer executable code, wherein the computer executable code comprises:
a firmware module for the management controller; and
a simulator module configured to simulate a simulated host computing device for the management controller and at least one simulated device connected to the simulated host computing device and encompassed by at least one cooling zone of the simulated host computing device, wherein the management controller is not communicatively connected to an actual host computing device simulated by the simulator module;
wherein the firmware module and the simulator module are both stored in the storage device of the management controller and executable at the processor of the management controller;
wherein the firmware module, when executed at the processor, is configured to receive at least one thermal output signal from the at least one cooling zone of the simulated host computing device or from the at least one simulated device encompassed by the at least one cooling zone of the simulated host computing device, and to perform a test using the at least one thermal output signal;

wherein the simulator module, when executed at the processor, is configured to simulate thermal features of the at least one cooling zone of the simulated host computing device and the at least one simulated device encompassed by the at least one cooling zone of the simulated host computing device by:
- generating the at least one thermal output signal based on configuration data of the at least one cooling zone of the simulated host computing device or the at least one simulated device encompassed by the at least one cooling zone of the simulated host computing device; and
- sending the at least one thermal output signal to the firmware module;

wherein the at least one simulated device connected to the simulated host computing device comprises:
- a simulated computer tachometer sensor;
- a simulated universal serial bus (USB) interface; and
- a simulated Host Embedded Controller Interface (HECI).

2. The system as claimed in claim 1, wherein the management controller is a baseboard management controller (BMC).

3. The system as claimed in claim 1, wherein the firmware module comprises a library module storing a plurality of library programs for the at least one cooling zone of the simulated host computing device.

4. The system as claimed in claim 3, wherein the simulator module comprises:
- a data store storing the configuration data of the at least one cooling zone of the simulated host computing device or the at least one simulated device encompassed by the at least one cooling zone of the simulated host computing device; and
- at least one thermal simulator sub-module, each configured to simulate the thermal features of one of the at least one cooling zone of the simulated host computing device or one of the at least one simulated device encompassed by the at least one cooling zone of the simulated host computing device by:
  - receiving a request from one of the library programs of the library module;
  - generating the at least one thermal output signal as a response to the request for the thermal features of the at least one cooling zone or the at least one simulated device based on the configuration data stored in the data store; and
  - sending the response to the library module.

5. The system as claimed in claim 1, wherein the configuration data comprises:
- at least one thermal algorithm for the at least one cooling zone of the simulated host computing device;
- at least one master profile of the at least one cooling zone of the simulated host computing device; and
- at least one parameter profile corresponding to at least one parameter of the at least one simulated device connected to the simulated host computing device, room or air flow path within each of the at least one cooling zone of the simulated host computing device, and an environment external to the cooling zone.

6. The system as claimed in claim 5, wherein the at least one thermal algorithm comprises at least one heat flow out algorithm, at least one heat buildup algorithm, and at least one zone temperature algorithm.

7. The system as claimed in claim 5, wherein a value of each of the parameters is a static value, a random value within a range, a value obtained from one or more patterns, a value derived from a function of another set of variables, a value set by an administrator, a time-based value, or a value picked from a socket server.

8. The system as claimed in claim 1, wherein the at least one simulated device connected to the simulated host computing device further comprises:
- a simulated voltage sensor;
- a simulated Inter-Integrated Circuit (I2C) device;
- a simulated power supply unit (PSU);
- a simulated complex programmable logic device (CPLD);
- a simulated field-replaceable unit (FRU);
- a simulated Redundant Array of Independent Disks (RAID) controller;
- a simulated RAID-on-chip (ROC);
- a simulated network interface card (NIC);
- a simulated satellite management controller;
- a simulated interface connected to the simulated satellite management controller; and
- a simulated system interface.

9. A method for thermal simulation for development projects of a management controller, the method comprising:
- providing a simulator module in the management controller to simulate thermal features of at least one cooling zone of a simulated host computing device for the management controller and at least one simulated device connected to the simulated host computing device and encompassed by the at least one cooling zone of the simulated host computing device, wherein the management controller is not communicatively connected to an actual host computing device simulated by the simulator module;
- generating, by the simulator module, at least one thermal output signal based on configuration data of the at least one cooling zone of the simulated host computing device or the at least one simulated device encompassed by the at least one cooling zone of the simulated host computing device;
- sending, by the simulator module, the at least one thermal output signal to a firmware module of the management controller, such that the firmware module receives the at least one thermal output signal from the at least one cooling zone of the simulated host computing device or from the at least one simulated device encompassed by the at least one cooling zone of the simulated host computing device; and
- upon receiving the at least one thermal output signal from the simulated host computing device or from the at least one simulated device encompassed by the at least one cooling zone of the simulated host computing device, performing, by the firmware module, a test using the at least one thermal output signal, wherein the firmware module and the simulator module are both stored in a storage device of the management controller and executable at a processor of the management controller;

wherein the at least one simulated device connected to the simulated host computing device comprises:
- a simulated computer tachometer sensor;
- a simulated universal serial bus (USB) interface; and
- a simulated Host Embedded Controller Interface (HECI).

10. The method as claimed in claim 9, wherein the management controller is a baseboard management controller (BMC).

11. The method as claimed in claim 9, wherein the firmware module comprises a library module storing a plurality of library programs for the at least one cooling zone of the simulated host computing device, and the simulator module comprises:
- a data store storing the configuration data of the at least one cooling zone of the simulated host computing device or the at least one simulated device encompassed by the at least one cooling zone of the simulated host computing device; and
- at least one thermal simulator sub-module, each configured to simulate the thermal features of one of the at least one cooling zone of the simulated host computing device or one of the at least one simulated device encompassed by the at least one cooling zone of the simulated host computing device by:
  - receiving a request from one of the library programs of the library module;
  - generating the at least one thermal output signal as a response to the request for the thermal features of the at least one cooling zone or the at least one simulated device based on the configuration data stored in the data store; and
  - sending the response to the library module.

12. The method as claimed in claim 9, wherein the configuration data comprises:
- at least one thermal algorithm for the at least one cooling zone of the simulated host computing device;
- at least one master profile of the at least one cooling zone of the simulated host computing device; and
- at least one parameter profile corresponding to at least one parameter of the at least one simulated device connected to the simulated host computing device, room or air flow path within each of the at least one cooling zone of the simulated host computing device, and an environment external to the cooling zone.

13. The method as claimed in claim 12, wherein the at least one thermal algorithm comprises at least one heat flow out algorithm, at least one heat buildup algorithm, and at least one zone temperature algorithm.

14. The method as claimed in claim 12, wherein a value of each of the parameters is a static value, a random value within a range, a value obtained from one or more patterns, a value derived from a function of another set of variables, a value set by an administrator, a time-based value, or a value picked from a socket server.

15. The method as claimed in claim 9, wherein the at least one simulated device connected to the simulated host computing device further comprises:
- a simulated voltage sensor;
- a simulated Inter-Integrated Circuit (I2C) device;
- a simulated power supply unit (PSU);
- a simulated complex programmable logic device (CPLD);
- a simulated field-replaceable unit (FRU);
- a simulated Redundant Array of Independent Disks (RAID) controller;
- a simulated RAID-on-chip (ROC);
- a simulated network interface card (NIC);
- a simulated satellite management controller;
- a simulated interface connected to the simulated satellite management controller; and
- a simulated system interface.

16. A non-transitory computer readable medium storing computer executable code, wherein the computer executable code, when executed at a processor of an management controller, is configured to:
- simulate, by a simulator module in the management controller, thermal features of at least one cooling zone of a simulated host computing device and at least one simulated device connected to the simulated host computing device and encompassed by the at least one cooling zone of the simulated host computing device, wherein the management controller is not communicatively connected to an actual host computing device simulated by the simulator module, and a firmware module of the management controller is configured to receive at least one thermal output signal from the at least one cooling zone;
- generate, by the simulator module, at least one thermal output signal based on configuration data of the at least one cooling zone of the simulated host computing device or the at least one simulated device encompassed by the at least one cooling zone of the simulated host computing device;
- send, by the simulator module, the at least one thermal output signal to the firmware module of the management controller, such that the firmware module receives the at least one thermal output signal from the at least one cooling zone of the simulated host computing device or from the at least one simulated device encompassed by the at least one cooling zone of the simulated host computing device; and
- upon receiving the at least one thermal output signal from the simulated host computing device or from the at least one simulated device encompassed by the at least one cooling zone of the simulated host computing device, perform, by the firmware module, a test using the at least one thermal output signal,
- wherein the firmware module and the simulator module are both stored in a storage device of the management controller and executable at a processor of the management controller;
- wherein the at least one simulated device connected to the simulated host computing device comprises:
  - a simulated computer tachometer sensor;
  - a simulated universal serial bus (USB) interface; and
  - a simulated Host Embedded Controller Interface (HECI).

17. The non-transitory computer readable medium as claimed in claim 16, wherein the management controller is a baseboard management controller (BMC).

18. The non-transitory computer readable medium as claimed in claim 16, wherein the firmware module comprises a library module storing a plurality of library programs for the at least one cooling zone of the simulated host computing device, and the simulator module comprises:
- a data store storing the configuration data of the at least one cooling zone of the simulated host computing device or the at least one simulated device encompassed by the at least one cooling zone of the simulated host computing device; and
- at least one thermal simulator sub-module, each configured to simulate the thermal features of one of the at least one cooling zone of the simulated host computing device or one of the at least one simulated device encompassed by the at least one cooling zone of the simulated host computing device by:
  - receiving a request from one of the library programs of the library module;
  - generating the at least one thermal output signal as a response to the request for the thermal features of the at least one cooling zone or the at least one simulated device based on the configuration data stored in the data store; and
  - sending the response to the library module.

19. The non-transitory computer readable medium as claimed in claim 16, wherein the configuration data comprises:
- at least one thermal algorithm for the at least one cooling zone of the simulated host computing device;
- at least one master profile of the at least one cooling zone of the simulated host computing device; and
- at least one parameter profile corresponding to at least one parameter of the at least one simulated device connected to the simulated host computing device, room or air flow path within each of the at least one cooling zone of the simulated host computing device, and an environment external to the cooling zone,
- wherein a value of each of the parameters is a static value, a random value within a range, a value obtained from one or more patterns, a value derived from a function of another set of variables, a value set by an administrator, a time-based value, or a value picked from a socket server.

20. The non-transitory computer readable medium as claimed in claim 16, wherein the at least one simulated device connected to the simulated host computing device further comprises:
- a simulated voltage sensor;
- a simulated Inter-Integrated Circuit (I2C) device;
- a simulated power supply unit (PSU);
- a simulated complex programmable logic device (CPLD);
- a simulated field-replaceable unit (FRU);
- a simulated Redundant Array of Independent Disks (RAID) controller;
- a simulated RAID-on-chip (ROC);
- a simulated network interface card (NIC);
- a simulated satellite management controller;
- a simulated interface connected to the simulated satellite management controller; and
- a simulated system interface.

* * * * *